US009234770B2

(12) United States Patent
Kulik et al.

(10) Patent No.: US 9,234,770 B2
(45) Date of Patent: Jan. 12, 2016

(54) DYNAMIC SENSOR RANGE

(75) Inventors: Victor Kulik, San Jose, CA (US);
Joseph Czompo, Santa Clara, CA (US);
Cristina A. Seibert, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 12/763,017

(22) Filed: Apr. 19, 2010

(65) Prior Publication Data

US 2011/0257936 A1    Oct. 20, 2011

(51) Int. Cl.
*G06F 15/00* (2006.01)
*G01D 3/024* (2006.01)

(52) U.S. Cl.
CPC ...................................... *G01D 3/024* (2013.01)

(58) Field of Classification Search
CPC ................................ G06F 17/18; G01D 3/024
USPC ........................................... 702/189; 356/623
See application file for complete search history.

(56) References Cited

U.S. PATENT DOCUMENTS

| | | | |
|---|---|---|---|
| 5,097,335 A * | 3/1992 | Cok | 348/251 |
| 5,850,472 A * | 12/1998 | Alston et al. | 382/162 |
| 6,047,244 A | 4/2000 | Rud, Jr. | |
| 7,365,452 B2 | 4/2008 | Endo et al. | |
| 2002/0154318 A1* | 10/2002 | Matsunaga et al. | 356/623 |
| 2005/0248660 A1* | 11/2005 | Stavely et al. | 348/208.16 |
| 2007/0097372 A1* | 5/2007 | Itagaki | 356/437 |

FOREIGN PATENT DOCUMENTS

| | | |
|---|---|---|
| CN | 1236105 A | 11/1999 |
| CN | 1497250 A | 5/2004 |
| EP | 0961120 A2 | 12/1999 |
| EP | 1788398 A1 | 5/2007 |
| EP | 2056115 A1 | 5/2009 |
| JP | 2226074 A | 9/1990 |
| JP | 2007278725 A | 10/2007 |

OTHER PUBLICATIONS

International Search Report and Written Opinion—PCT/US2011/033095—ISA/EPO—Oct. 7, 2011.
European Search Report—EP14189286—Search Authority—Munich—Feb. 20, 2015.

* cited by examiner

*Primary Examiner* — Patrick Assouad
*Assistant Examiner* — Haidong Zhang
(74) *Attorney, Agent, or Firm* — M. Munes Tomeh

(57) ABSTRACT

A device for sensing a phenomenon using a dynamic measurement range includes: a sensing element configured to measure the phenomenon using a first measurement range and to provide an analog indication of a value of the phenomenon; an analog-to-digital converter (ADC) coupled to the sensing element and configured to convert the analog indication to a digital indication; and a processor coupled to the ADC and the sensing element and configured to analyze the digital indication to determine a second measurement range for the sensing element and to cause the sensing element to change from the first measurement range to the second measurement range for measurement of the phenomenon, the first measurement range being different than the second measurement range.

34 Claims, 8 Drawing Sheets

DYNAMIC SENSOR RANGE

BACKGROUND

Sensors exist for detecting a variety of quantities, such as speed, acceleration, temperature, pressure, light, motion, magnetic field, etc. Some existing sensors such as the Bosch SMB380 accelerometer allow their measurement ranges to be set by a user who performs an adjustment operation to set a relatively static range. Once set, the sensor uses the range to detect a phenomenon/circumstance specific to the sensor.

Numerous mechanical and electrical devices, from automobiles to cellular phones, use some kind of sensor or sensors. Depending on the application, different sensor measurement ranges and offsets may be of interest. For example, a movement detection application may care about sensor readings around some threshold of interest. Values significantly below or above the threshold may be irrelevant to the application, but readings in the immediate vicinity of the threshold may need to be known precisely.

With today's sensors, measurement precision is typically determined by the sensor output bitwidth (which is a function of an analog-to-digital converter (ADC) in digital sensors) and the measurement range that the sensor is programmed to cover. For example, typical ranges for an accelerometer are between −2 g and +2, between −4 g and +4 g and between −8 g and +8 g. Movement detection application sensors may have measurement precision on the order of mg. With today's sensor designs, however, assuming a 6-bit output and a range of +/−2 g, the measurement precision becomes 4 g/64=g/16 or on the order of tens to a hundred mg, thus a lot less accurate than desired.

Sensor parameters are typically trimmed during production according to customer needs. In other cases, the sensor parameters could be customized by the user by choosing nominal values of certain electronic components (e.g., capacitors and/or resistors) external to the sensor's hardware. The sensor parameters remained constant through the operation cycle, or even through the lifetime of the device.

Sensors are now featuring customizable "on the fly" parameters that the user may change when needed, by sending a re-configuration command to the sensor. For example, magnetic compasses commonly have measurement range around 0.7 Gauss, which is the maximum Earth Magnetic field. Single-range compasses are designed with a wider range (typically 2-6 Gauss) to accommodate for the possible compass proximity to metal objects, inside the device or outside of it. Many state of the art compasses are featuring user-selectable measurement ranges. As further examples, to accommodate different motion modes, accelerometers are often designed with user-selectable ranges, such as 2 g, 4 g, 8 g, and gyroscopes are often designed with user-selectable ranges of 100 degrees per second and 300 degrees per second.

For sensors featuring configurable measurement ranges, the ranges are normally set by the application to as narrow as possible for the given mode. This is because the sensor error (noise, offset, drift, quantization error for digital sensors) does not typically depend on the measured parameter value, but rather on the sensor measurement range. Sometimes the error is directly proportional to the measurement range, or even if it is not, the error will be higher at a wider measurement range. Thus reducing the range will usually result in the reduction of the measurement error. The ranges, however, are set to the widest range for the given mode, and for multiple modes if the mode of use is not known in advance.

SUMMARY

An example of a device for sensing a phenomenon using a dynamic measurement range includes: a sensing element configured to measure the phenomenon using a first measurement range and to provide an analog indication of a value of the phenomenon; an analog-to-digital converter (ADC) coupled to the sensing element and configured to convert the analog indication to a digital indication; and a processor coupled to the ADC and the sensing element and configured to analyze the digital indication to determine a second measurement range for the sensing element and to cause the sensing element to change from the first measurement range to the second measurement range for measurement of the phenomenon, the first measurement range being different than the second measurement range.

Embodiments of such a device may include one or more of the following features. The processor is configured to determine a desired measurement range for the sensing element and to provide a signal to the sensing element to cause the sensing element to use the desired measurement range as the second measurement range to measure the phenomenon. The processor is configured to determine whether the value of the phenomenon is within the first measurement range and whether the first measurement range is a smallest available measurement range of the sensing element and, in response to the value being within the first measurement range and the first measurement range being larger than the smallest available measurement range, to cause the second measurement range to be smaller than the first measurement range. The processor is configured to respond to a determination that the value of the phenomenon is outside the first measurement range to cause the second measurement range to be larger than the first measurement range.

Alternatively or additionally, embodiments of such a device may include one or more of the following features. The processor is configured to cause the sensing element to change from the first measurement range to the second measurement range for measurement of the phenomenon based on an expected measurement value of the phenomenon. The processor is configured to cause the sensing element to change to the second measurement range in response to a determination that the value of the phenomenon is changing rapidly. The processor is configured to cause the sensing element to change to the second measurement range in response to a determination that the value of the phenomenon is within a threshold of a boundary of the first measurement range. The processor is configured to cause the sensing element to change to the second measurement range in accordance with a predefined sequence of available measurement ranges.

An example of a device for sensing a phenomenon includes: a sensing element configured to measure the phenomenon concurrently using combinations of measurement range and offset and to provide corresponding analog outputs, for the combinations of measurement range and offset, corresponding to a value of the phenomenon; an analog-to-digital converter (ADC) coupled to the sensing element and configured to convert the analog outputs into digital outputs; and a processor coupled to the ADC and configured to analyze the digital outputs and to cause one of the digital outputs to be output by the device.

Embodiments of such a device may include one or more of the following features. The combinations include different offsets and a similar measurement range. The similar measurement range is a smallest measurement range available for the sensing element.

Another example of a device for sensing a phenomenon includes: measurement means for measuring the phenomenon using combinations of measurement range and offset and concurrently to provide a corresponding analog output for each of the combinations of measurement range and offset corresponding to a value of the phenomenon; an analog-to-digital converter (ADC) coupled to the measurement means and configured to convert the analog outputs into digital outputs; and selection means coupled to the ADC for selectively causing one of the digital outputs to be output by the device.

Embodiments of such a device may include one or more of the following features. The combinations include different offsets and a similar measurement range. The similar measurement range is a smallest measurement range available for the sensing element.

An example of a method of measuring a phenomenon includes: sensing the phenomenon with a sensing element applying a first measurement range; providing a first indication of a result of the sensing applying the first measurement range; sensing the phenomenon with the sensing element applying a second measurement range, the second measurement range being different than the first measurement range; and providing a second indication of a result of the sensing applying the second measurement range.

Embodiments of such a method may include one or more of the following features. The method further includes: determining whether the first indication is indicative of a valid, within range, measurement; and sensing the phenomenon with the sensing element applying the second measurement range is in response to determining that the first indication is indicative of an invalid, out-of-range, measurement; where the second measurement range is larger than the first measurement range. The method further includes: determining whether the first indication is indicative of a valid, within range, measurement; determining whether the first measurement range is a smallest available range of the sensing element; and sensing the phenomenon with the sensing element applying the second measurement range is in response to the first indication being indicative of a valid, in-range, measurement of a first value, and the first measurement range being larger than the smallest available range of the sensing element; where the second measurement range is smaller than the first measurement range. The second measurement range is the smallest available range of the sensing element, the method further including setting an offset of the sensing element such that the first value will be within the second measurement range adjusted by the offset. The method further includes determining an expected value of the phenomenon, where the second measurement range is based on the expected measurement value of the phenomenon. The method further includes: determining whether the first indication is indicative of a valid, within range, measurement; and sensing the phenomenon with the sensing element applying the second measurement range is in response to determining that a value of the phenomenon is changing rapidly. Sensing the phenomenon with the sensing element applying the second measurement range is in response to a determination that a value of the phenomenon is within a threshold of a boundary of the first measurement range. The method further includes selecting the second measurement range in accordance with a predefined sequence of available measurement ranges.

An example of a computer program product residing on a computer-readable medium includes computer-readable instructions configured to cause a processor to: analyze an indication of a value of a phenomenon sensed by a sensing element using a first measurement range; determine a second measurement range for the sensing element based upon the indication of the value sensed using the first measurement range; and cause the sensing element to change from the first measurement range to the second measurement range for sensing the phenomenon, the first measurement range being different than the second measurement range.

Embodiments of such a computer program product may include one or more of the following features. The instructions configured to cause the processor to analyze the indication are configured to cause the processor to determine whether the value of the phenomenon is within the first measurement range and whether the first measurement range is a smallest available measurement range of the sensing element and, in response to the value being within the first measurement range and the first measurement range being larger than the smallest available measurement range, to cause the second measurement range to be smaller than the first measurement range. The instructions configured to cause the sensing element to change to the second measurement range are configured to cause the processor to respond to a determination that the value of the phenomenon is outside the first measurement range to cause the second measurement range to be larger than the first measurement range. The computer program product further includes instructions configured to cause the processor to determine an expected measurement value of the phenomenon, where the instructions configured to cause the sensing element to change to the second measurement range are configured to set the second measurement range based on the expected measurement value of the phenomenon. The instructions configured to cause the sensing element to change to the second measurement range are configured to cause the sensing element to change to the second measurement range in response to a determination that the value of the phenomenon is changing rapidly. The instructions configured to cause the sensing element to change to the second measurement range are configured to cause the sensing element to change to the second measurement range in response to a determination that the value of the phenomenon is within a threshold of a boundary of the first measurement range. The instructions configured to cause the sensing element to change to the second measurement range are configured to cause the sensing element to change to the second measurement range in accordance with a predefined sequence of available measurement ranges.

Items and/or techniques described herein may provide one or more of the following capabilities. Measurement accuracy of phenomena may be increased. For example, measurement cycles with different measurement ranges can be used, and/or multiple concurrent measurement can be sensed by sensing elements, converted to digital form with one or more converters, and analyzed for a valid measurement value acquired using a desired measurement range, and thus measurement accuracy. Time used to determine a valid, in-range measurement of a phenomenon, and/or a sequence of valid measurements, may be decreased. Measurement range of a sensing element may be dynamically changed, including adapting to changing measurements. While item/technique-effect pairs have been described, it may be possible for a noted effect to be achieved by means other than those noted, and a noted item/technique may not necessarily yield the noted effect.

DETAILED DESCRIPTION

Techniques described herein provide dynamically-adjustable sensor ranges. Sensors can be controlled internally or externally to set their sensitivity ranges. For example, one or more previous measurements by a sensor are used to determine a range to capture a future quantity of a phenomenon/circumstance with a desired level of accuracy, preferably the highest level of accuracy within the constraints of the sensor that will include the future quantity of the phenomenon. Further, an offset of the sensor is also preferably dynamically adjusted to help permit a narrower range that will include the future quantity. Other embodiments are within the scope of the disclosure and claims.

Figure 1:
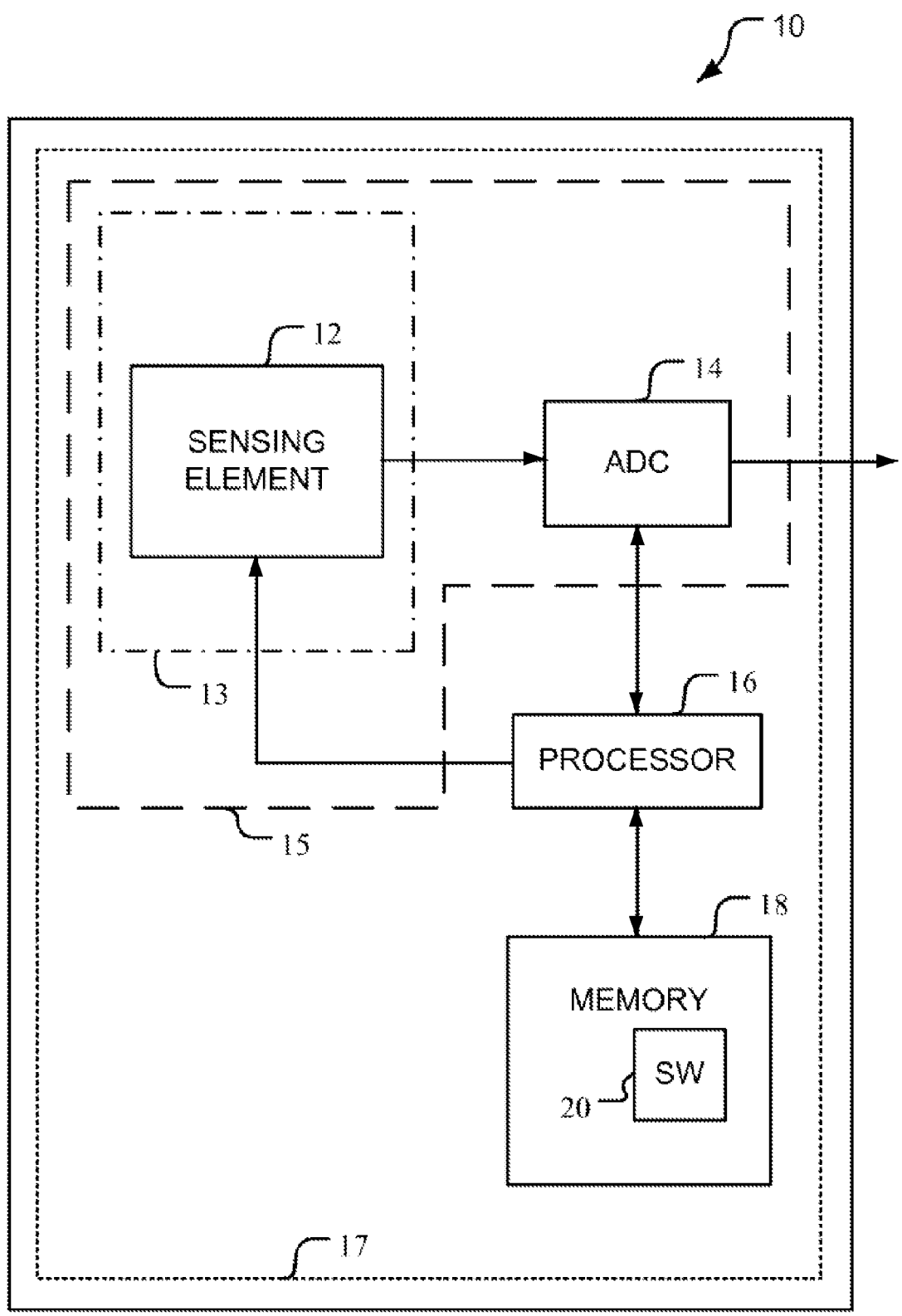
FIG. 1 is a block diagram of a device including a sensing element.

Referring to FIG. 1, a sensor-included device 10 includes a sensing element 12, an analog-to-digital converter (ADC) 14, a processor 16, and memory 18. The processor 16 is preferably an intelligent hardware device, e.g., a central processing unit (CPU) such as those made by Intel® Corporation or AMD®, a microcontroller, an application specific integrated circuit (ASIC), etc. The memory 18 is configured to store information and may include, e.g., random access memory (RAM) and/or read-only memory (ROM). The memory 18 stores computer-readable, computer-executable software code 20 containing instructions that are configured to, when executed, cause the processor 16 to perform various functions described herein. Alternatively, the software 20 may not be directly executable by the processor 16 but configured to be compiled and then executed by the processor 16 to perform the functions.

Various combinations of the sensing element 12, the ADC 14, the processor 16, and the memory 18 may be part of a sensor. For example, the sensing element 12 may be the sole component (of the components shown in FIG. 1) of a sensor 13 with the other components shown in FIG. 1 being external to the sensor 13. Alternatively, the sensing element 12 and the ADC 14 may be internal to a sensor 15, with the processor 16 and the memory 18 external to the sensor 15. Further, the sensing element 12, the ADC 14, the processor 16, and the memory 18 could all be internal parts of a sensor 17. Still other configurations are possible.

Figure 2:
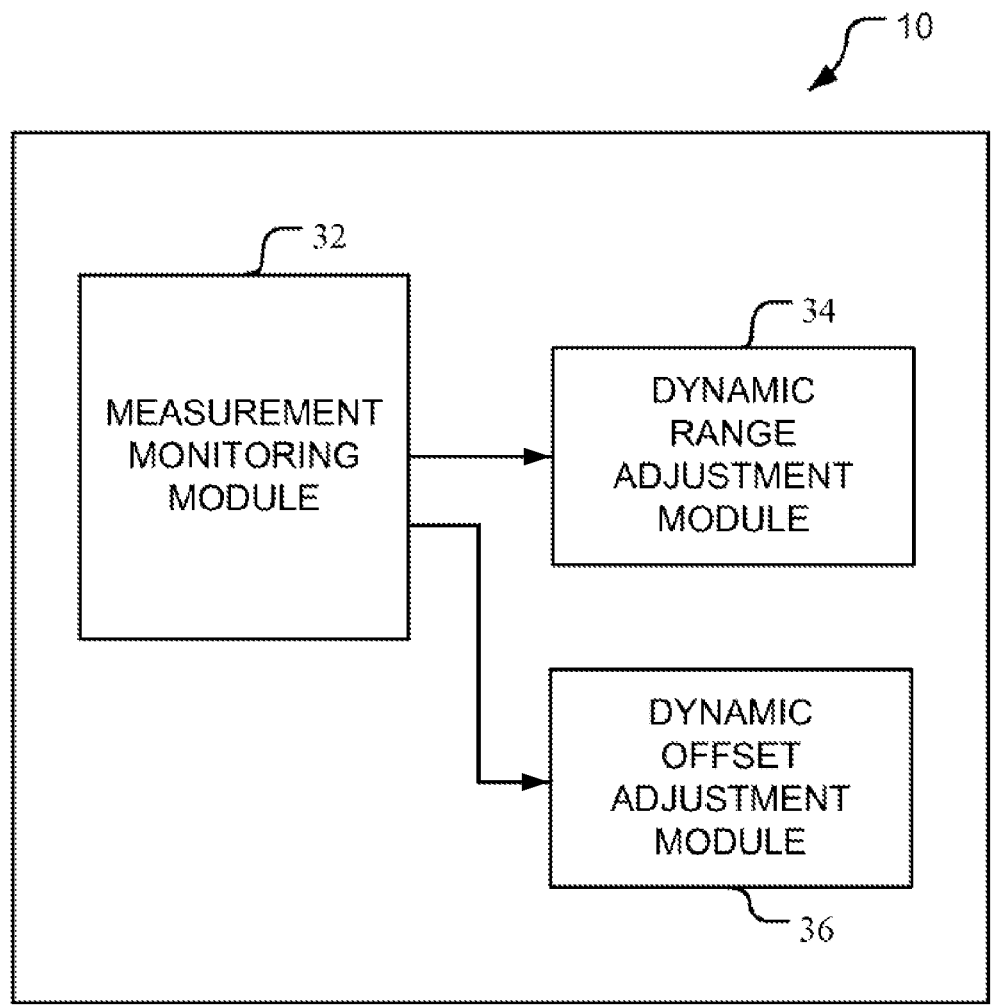
FIG. 2 is a functional block diagram of the device shown in FIG. 1.

Referring also to FIG. 2, the device 10 functionally includes a measurement monitoring module 32, a dynamic range adjustment module 34, and a dynamic offset adjustment module 36. The modules 32, 34, 36 are preferably implemented by the processor 16 and the memory 18. The monitoring module 32 receives and/or stores information regarding measurements taken by the sensing element 12. The range adjustment module 34 uses the information from the monitoring module to determine whether and how to adjust a range of the sensing element 12 for future measurements. The offset adjustment module 36 uses the information from the monitoring module to determine whether and how to adjust an offset of the sensing element 12 for future measurements.

Figure 3:
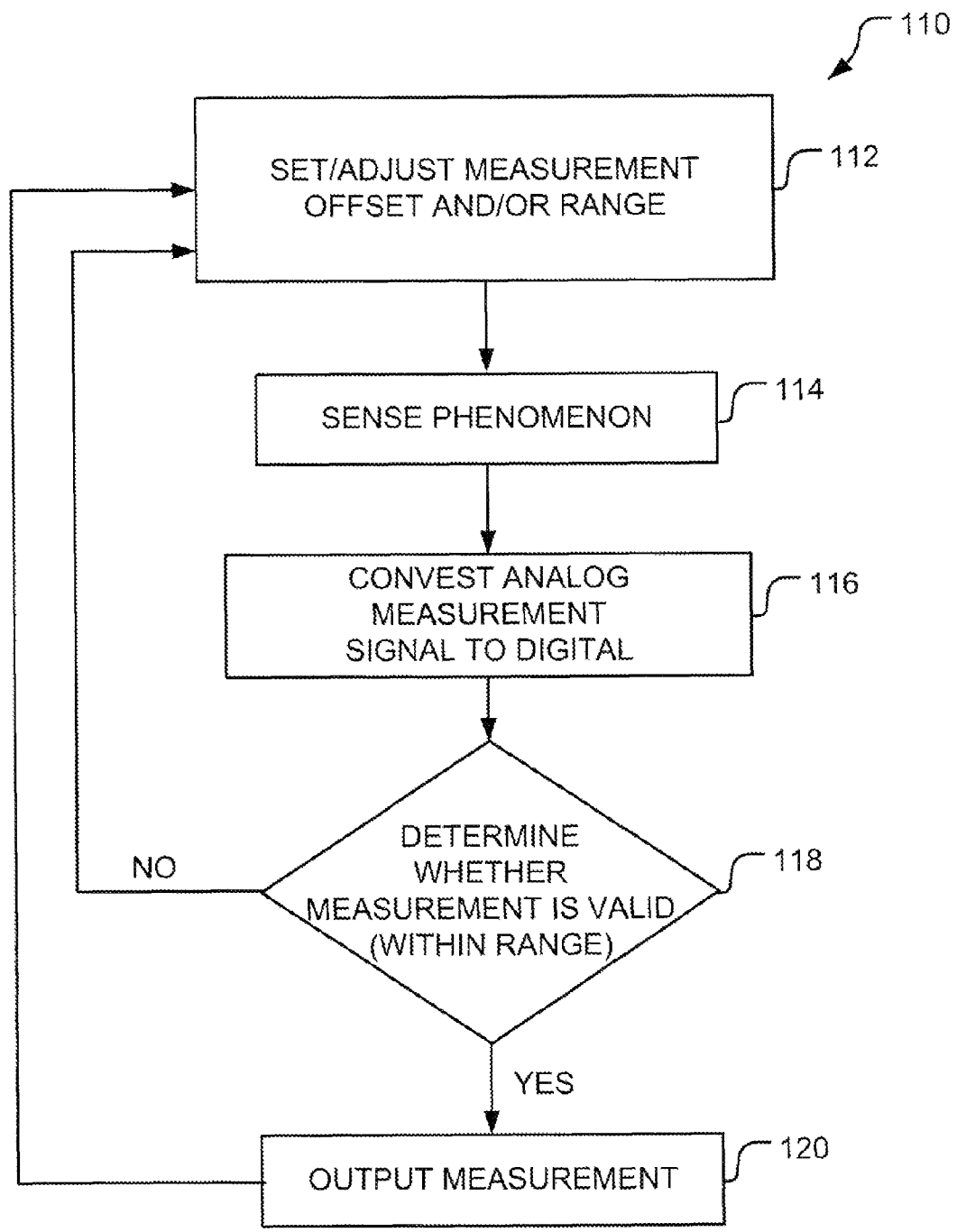
FIG. 3 is a block flow diagram of a process of dynamically setting and adjusting offset and/or range of the sensing element shown in FIG. 1.

Referring to FIG. 3, with further reference to FIGS. 1-2, a process 110 of the dynamically adjusting measurement range and/or offset of the sensing element 12 includes the stages shown. The process 110 is exemplary only, and is not limiting. The process 110 may be altered, e.g., by having stages added, removed, or rearranged.

At stage 112, the measurement offset and range for the sensing element 12 are set. The initial pass through in stage 112 sees the offset and range of the sensing element 12 set to default values. Future passes through the stage 112 will have the measurement offset and/or range adjusted as appropriate as discussed below. The offset is preferably set to a default value in a center of a maximum range of values to be sensed by the sensing element 12. For example, for an accelerometer expected to measure values in a range from −8 g to +8 g, the offset is preferably set to 0 g. If the expected range was from −4 g to +12 g, then the offset would preferably be set to +4 g. The default range is preferably set to the smallest range to be used by the sensing element 12, where at least a relatively small yet practical range for including a reasonably large number or amount of values expected to be sensed by the sensing element 12. For example, for an accelerometer sensing element 12 with range values of +/−2 g, +/−4 g, or +/−8 g, the default range is preferably initially set to +/−2 g. Preferably, the sensing element 12 has a fixed number of ranges to which the element 12 can be set. The quantity of acceptable ranges is preferably relatively small, e.g., 3 or 5 ranges. The quantity of acceptable ranges is preferably small enough such that each of the ranges can be set and used for sensing a parameter all within a reasonable amount of time such that a result can be obtained and provided to a user. Preferably the default range is wide enough to encompass a reasonable amount of measurements while providing desirable accuracy.

At stage 114, the relevant parameter or phenomenon is sensed. The sensing element 12, applying or using the offset and range established at stage 112, senses the appropriate phenomenon. For example, the sensing element 12 may sense acceleration, speed, temperature, pressure, humidity, etc.

In stage 116, the sensed value from stage 114 is converted to digital form. The ADC 14 receives an analog signal from the sensing element 12 indicative of a value of the sensed phenomenon and converts the analog signal to digital form. The ADC 14 provides indications of the digital value of the sensed phenomenon to the processor 16 and to an output of the device 10. The output of the device 10 may be provided in a numerical form or provided through means of a display (not shown in FIG. 1).

At stage 118, an inquiry is made as to whether the measurement from the sensing element 12 is valid, i.e., within the present range of the sensing element 12. If the measurement from the sensing element 12 is within the present range of the sensing element 12, then the processor 16 sends an indication to the ADC 14 to proceed to output the measurement value in stage 120. If, however, the measurement is not valid, i.e., not within the present sensing element range, then the processor 16 will indicate to the ADC 14 not to output the present measurement and the process 110 will return to stage 112.

In the second or further pass through the stage 112, the measurement offset and/or range of the sensing element 12 can be adjusted as appropriate. The processor 16 can determine whether a better offset and/or range can be used for the sensing element. For example, a better range may be a more narrow range providing more accuracy and less noise. A smaller range, however, may not be available, e.g., if the present range is already at the lowest settable range for the sensing element 12. Further, the processor 16 may be able to set the offset of the sensing element 12 such that a smaller range may be used by the sensing element 12. The offset and/or range may be adjusted using a variety of techniques. For example, the offset can be cycled through all the available offsets, in any order such as from least to greatest, vice versa, random, etc. Thus, for example, for an accelerometer with +/−8 g range and available offsets of −6 g, −2 g, +2 g, and +6 g, the offset may be fixed at +/−2 g and the offset changed each pass through stage 112 such as −6 g, −2 g, +2 g, +6 g, −2 g, etc. The range may be cycled through in a similar manner, e.g., having a fixed offset of 0 g and a range that changes with each pass through stage 112 as +/−2, +/−4 g, +/−8 g, +/−2 g, etc. Such cycling may occur regardless of whether a valid measurement is obtained. Further techniques are discussed below.

Figure 4:
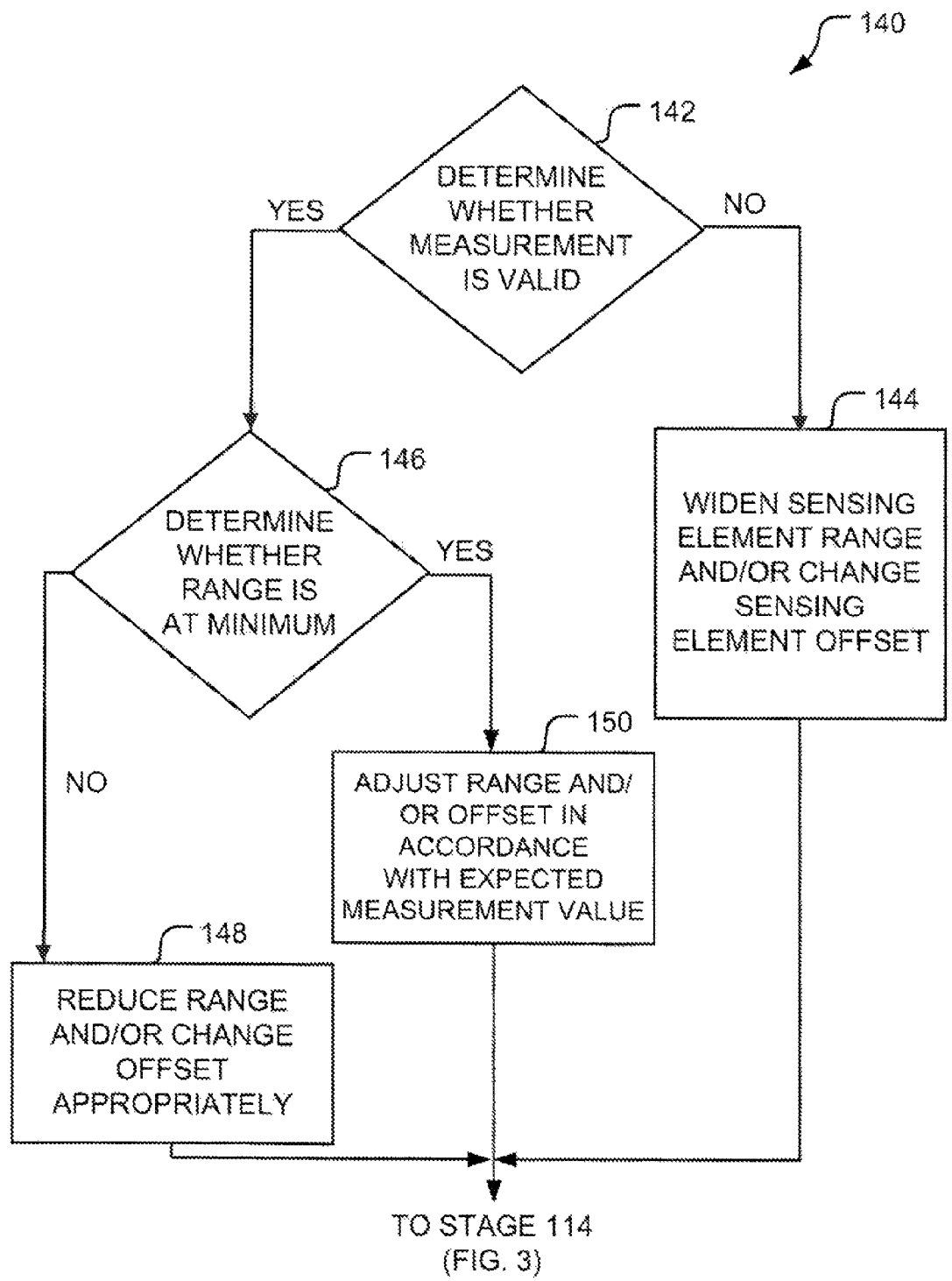
FIG. 4 is a block flow diagram of a process of adjusting the offset and/or range of the sensing element shown in FIG. 1.

Referring to FIG. 4, a process 140 of adjusting the measurement offset and/or range of the sensing element 12 in the second or further pass through the stage 112 includes the stages shown. The process 140 is exemplary only, and is not limiting. The process 140 may be altered, e.g., by having stages added, removed, or rearranged.

At stage 142, an inquiry is made as to whether the present measurement value is valid. This stage may be the same as stage 118 shown in FIG. 3 and thus is not a separate inquiry. The process 140 may have the stage 142 removed and proceed directly to stage 144 or stage 146, as appropriate. If the present measurement is not valid, then the process 140 proceeds to stage 144. If the present measurement is valid, then the process 140 proceeds to stage 146.

At stage 144, the processor 16 causes the sensing element 12 to have a wider range and/or a different offset. For example, the processor 16 can cause the offset to be increased if the measurement is not valid due to railing on the high end of the range. For example, if the sensing element 12 is an accelerometer with a present range of +/−2 g with an offset of 0 g and the measurement rails at +2 g, then the processor 16 can cause the sensing element 12 to increase its range to +/−4 g, and or to move its offset to +2 g. The process 140 then proceeds to stage 114 of FIG. 3.

At stage 146, with the present measurement being a valid measurement, an inquiry is made as to whether the present range is at the minimum available range. The processor 16 assesses whether the present setting for the sensing element 12 is the minimum range setting for the sensing element 12. If so, then the process 140 proceeds to stage 150, and otherwise the process 140 proceeds to stage 148.

At stage 148, the range of the sensing element 12 is reduced as appropriate and the offset of the sensing element 12 is changed as appropriate. The processor 16 causes the sensing element 12 to change to a smaller range, e.g., by sending a signal to the sensing element 12 to change to the next smaller available range. Alternatively, the range can be changed to the smallest range, to the range that is two available ranges smaller than the current range (if the next smaller range is not the smallest), etc. The processor 16 further causes the offset to be changed as appropriate, preferably such that the current measured value will be valid under the new offset/range combination. For example, if the offset is 0 g, the range is +/−4 g, and the measured value is −3.2, and the range is changed to +/−2 g, then the offset can be reset to the current measured value or another value such as, in this case, −3 g so that the current measured value of −3.2 g will be valid under the new offset/range combination.

At stage 150, the range and/or offset of the sensing element 12 is adjusted in accordance with an expected measurement value. The processor 16 analyzes previous measurement values to predict the next measurement value. The quantity of previous measurement values analyzed by the processor 16 is preferably two, although other quantities could be used. With the next measurement value predicted, the processor 16 sets the offset and range accordingly. Preferably, the processor 16 sets the offset to the predicted next measurement value (or to a extreme (minimum or maximum) available offset) or to the nearest-available offset, and sets the range to the smallest available/settable range. The processor 16 preferably sets the range to the smallest range only if the measured value is changing relatively slowly, or at least not too quickly, e.g., less rapidly than a threshold rate. Otherwise, the processor 16 can set the range to a smaller range than the current range, but not necessarily the smallest range, e.g., the next-smaller range compared to the current range. Alternatively, the processor 16 can set the range to accommodate the expected measurement value, e.g., by making the range larger, with or without changing the offset, such that the expected measurement value will fall within the new measurement range.

After either stage 148 or stage 150, the process 140 proceeds to stage 114 of FIG. 3.

Figure 5:
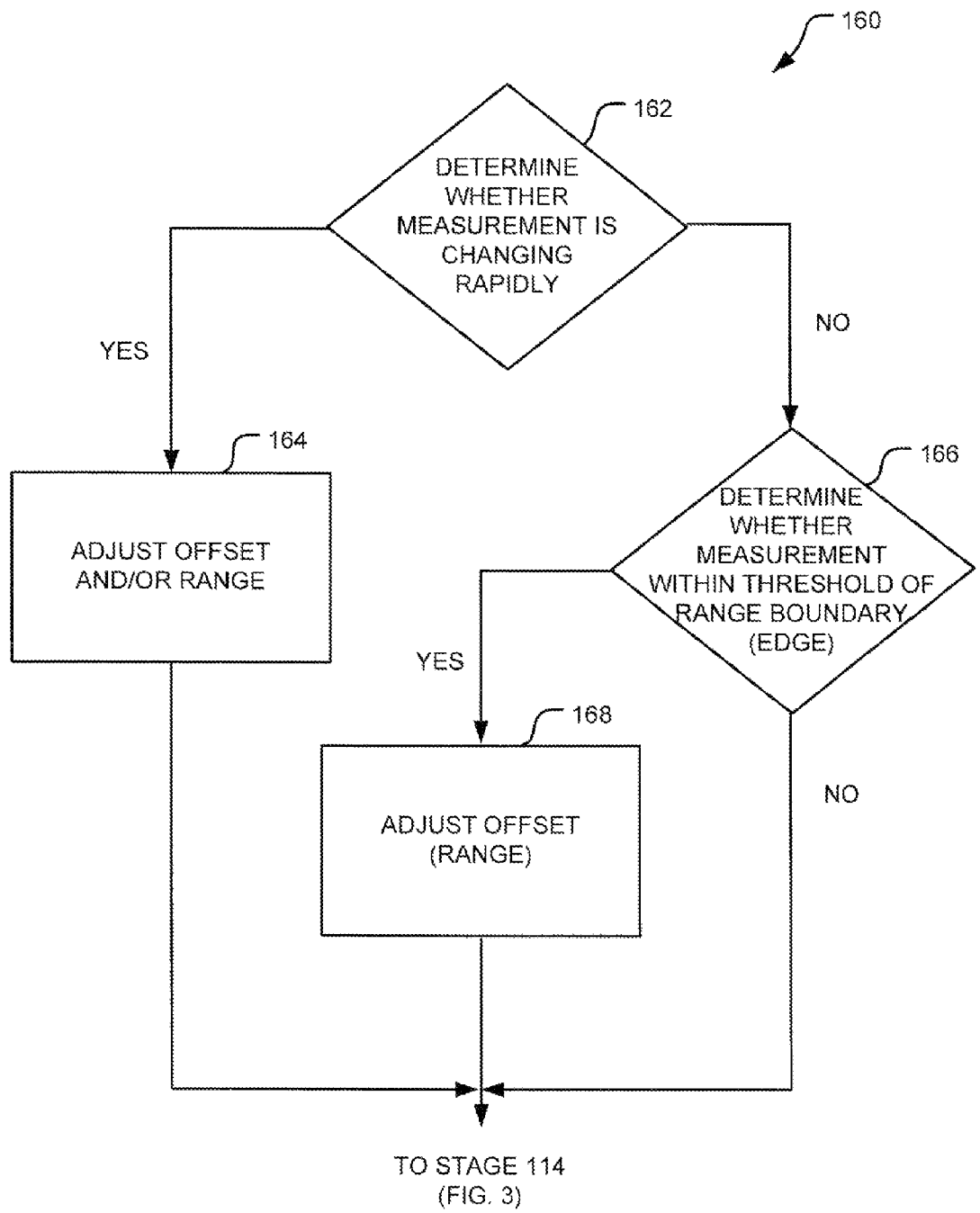
FIG. 5 is a block flow diagram of a process of adjusting sensing element range and/or offset based on expected measurement values.

Referring to FIG. 5, with further reference to FIGS. 1-4, a process 160 of implementing stage 150 shown in FIG. 4 includes the stages shown. The process 160 is exemplary only, and not limiting. For example, the process 160 may be altered, e.g., by having stages added, removed, or rearranged.

At stage 162, an inquiry is made and the processor 16 determines whether the measurements are changing rapidly. The processor 16 determines whether values sensed by the sensing element 12 are changing rapidly, e.g., more than a threshold rate between consecutive measurements, e.g., more than a predetermined percentage such as 5%, 10%, or other percentage. The processor 16 can determine the rate of change by evaluating previous measurements such as the previous 2 measurements, previous 3 measurements, etc. If the processor determines that the measurements are changing rapidly, then the process 160 proceeds to stage 164, where the processor 16 adjusts the offset and/or range of the sensing element 12. The processor 16 preferably adjusts the offset of the sensing element 12 to the predicted next value of the measurement and can adjust the range if, for example, the processor 16 determines that the measurements are changing so rapidly as to warrant a change in the range. For example, the processor 16 may widen the range of the sensing element 12 if the rate of change exceeds a threshold value such as 20%. If the processor 16 determines to change the value of the range, then the processor 16 preferably increments the range by 1 level of wider range, or to the maximum range as a default. If at stage 162 the processor determined that the measurement values from the sensing element 12 are not changing rapidly, then the process 160 proceeds to stage 166.

At stage 166, the processor 16 determines whether the measurement values are close enough to a range boundary to warrant a change in the offset of the sensing element 12. The processor 16 determines whether the present measurement value is within a threshold of a range boundary or edge. For example, the processor 16 can determine whether the present measurement is within a predetermined value of a measurement range boundary, e.g., within 0.2 g for a range of +/−2 g or within a percentage of the range. For example, the processor 16 can evaluate whether the present measurement is within 10% of the range of either range boundary (the low boundary or the high boundary). If the processor 16 determines that the present measurement is within the threshold of the range boundary, then the process 160 proceeds to stage 168 where the processor 16 adjusts the offset of the sensing element 12. The processor 16 could also adjust the range of the sensing element 12 although this is preferably not done as the measurements have been determined not to be changing rapidly. The processor 16 can predict the next measurement value and adjust the offsets of the sensing element 12 to that value, adjust the offset to the present measurement value, or adjust the offset to another value. If the processor 16 determines at stage 166 that the present measurement value is not within the threshold of a range boundary, then the process 160 proceeds to stage 114 shown in FIG. 3.

Figure 6:
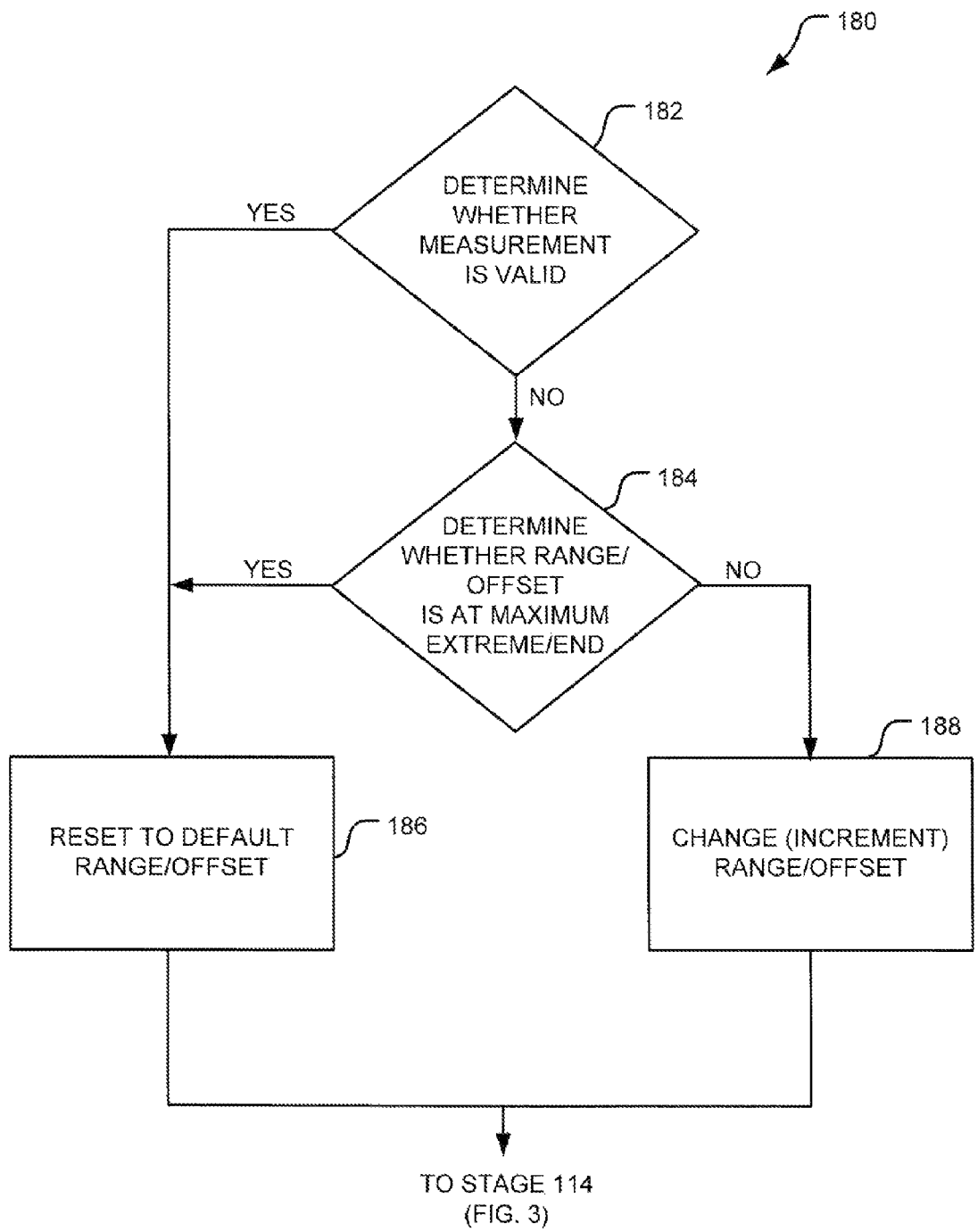
FIG. 6 is a block flow diagram of an alternative process of adjusting sensing element range and/or offset.

Referring to FIG. 6, with further reference to FIGS. 1-3, an alternative process 180 for implementing the adjustment of the measurement offset and/or range of stage 112 of FIG. 3 includes the stages shown. The process 180 is exemplary only, and is not limiting. The process 180 may be altered, e.g., by having stages added, removed or rearranged.

At stage 182 an inquiry is made as to whether the present measurement is valid. The processor 16 determines whether the present measurement is within the presently set measurement range of the sensing element 12. If the processor 16, through the measurement monitoring module 32, determines that the present measurement is valid, then the process 180 proceeds to stage 186 discussed below, and otherwise proceeds to stage 184. For example, stage 182 discussed below may be removed from the process 180.

At stage 184, an inquiry is made as to whether the present range or offset is at its maximum value. The processor 16 determines whether the present range is at the maximum range available for the sensing element 12. Alternatively, the processor 16 determines whether the present offset is at the highest available offset for the sensing element 12. The offsets available for the sensing element 12 may be predetermined lock-step offsets such that cycling through all the available offsets will cover the entire range available for the sensing element 12 or an entire desired measurement range. For example, for an accelerometer with a range of +/−4 g the range may be set at +/−2 g and the available offsets being −6 g, −2 g, +2 g, and +6 g. If the processor 16 determines at stage 184 that the range is at its maximum or that the offset is at its maximum available value, then the process 180 proceeds to stage 186, and otherwise proceeds to stage 188.

At stage 186, the range or offset is reset to its respective smallest available value. If the process 180 is for adjusting the range, then the range adjustment module 34 resets the present range of the sensing element 12 to the smallest range available, e.g., +/−2 g for an accelerometer. Alternatively, if the process 180 is for adjusting the offset of the sensing element 12, then the offset adjustment module 36 resets the offset of the sensing element 12 to its lowest value, e.g., −6 g in the example given in the previous paragraph.

At stage 188, the range or offset of the sensing element 12 is adjusted or incremented. If the process 180 is for adjusting the range of the sensing element 12, then the range adjustment module 34 adjusts, increments, or increases the range of the sensing element to the next available range increment. Alternatively, the range could be set at its widest range to begin with, and the adjustments at stage 188 being to decrease or decrement the range, although incrementing is preferred. Further, if the process 180 is for adjusting the offset of the sensing element 12 that has a fixed range, then at stage 188 the offset adjustment module 36 increments the offset to the next available offset value. As with the range adjustment, the offset could start at its highest level and move to lower levels. Further still, the offset values could be selected out of sequence or order such that all the available offsets are selected although not necessarily in increasing or decreasing order. For example, with available accelerometer offsets of −6 g, −2 g, +2 g, and +6 g, and a fixed range of +/−2 g, the sequence could be −6 g, −2 g, +2 g, +6 g, or +6 g, +2 g, −2 g, −6 g, or −6 g, +2 g, −2 g, +6 g, or other. This description is for a closed-loop system in which the processor 16 sets the offset of the sensing element. An open-loop configuration (where the processor 16 is not connected to provide signals to the sensing element 12) can be used where the processor 16 does not set the range or offset of the sensing element 12. For example, the sensing element 12 can be set to a single range and the offset changed by the sensing element 12 itself for each measurement cycle. Thus, for example, the range can be set to +/−2 g and the offset sequenced as above, with valid measurements being output by the ADC 14.

After the resetting at stage 186 or the adjustment of the range or offset at stage 188, the process 180 proceeds to stage 114 shown in FIG. 3.

EXAMPLES

The following tables illustrate exemplary sequences of offsets and ranges, and corresponding sensed and output measurement values. All the tables are for the example of an accelerometer with a maximum valid measurement range of +/−8 g.

Table 1 illustrates an exemplary embodiment where the sensing element 12 has available ranges of +/−8 g, +/−4 g, +/−2 g, a fixed offset of 0 g, and the processor 16 cycles through the available ranges. Here, the sensing element 12 outputs measurement values for all three ranges regardless of when a valid measurement is obtained. The processor 16 selects only the measurement with the smallest range for output.

TABLE 1

| Actual Value | Range | Sensing Element Output | ADC Output |
|---|---|---|---|
| 3.2 g | +/−2 g | Positive rail | None |
| 3.2 g | +/−4 g | 3.2 g | 3.2 g |
| 3.2 g | +/−8 g | 3.2 g | 3.2 g (as measured with +/−4 g range) |
| 3.7 g | +/−2 g | Positive rail | None |
| 4.6 g | +/−4 g | Positive rail | None |
| 4.9 g | +/−8 g | 4.9 g | 4.9 g |
| 4.9 g | +/−2 g | Positive rail | None |

Table 2 illustrates an exemplary embodiment where the sensing element 12 has available ranges of +/−8 g, +/−4 g, +/−2 g, a fixed offset of 0 g, and the processor 16 cycles through the available ranges. Here, the sensing element 12 is cycled through the ranges until a valid measurement. The sensing element's range is then reset to the initial range, either by the sensing element 12 itself, or by the processor 16.

TABLE 2

| Actual Value | Range | Sensing Element Output | ADC Output |
|---|---|---|---|
| 3.2 g | +/−2 g | Positive rail | None |
| 3.2 g | +/−4 g | 3.2 g | 3.2 g |
| 3.2 g | +/−2 g | Positive rail | None |
| 3.7 g | +/−4 g | 3.7 g | 3.7 g |
| 4.6 g | +/−2 g | Positive rail | None |
| 4.9 g | +/−4 g | Positive rail | None |
| 4.9 g | +/−8 g | 4.9 g | 4.9 g |

Table 3 illustrates an exemplary embodiment where the sensing element 12 has available ranges of +/−8 g, +/−4 g, and +/−2 g, available offsets between −6 g and +6 g, and the processor 16 adjusts the offset to the present measured value (here, with an accuracy of a tenth of a g), and sets the range to the smallest available range.

TABLE 3

| Actual Value | Offset | Range | Sensing Element Output | ADC Output |
|---|---|---|---|---|
| 3.2 g | 0 g | +/−8 g | 3.2 g | 3.2 g |
| 3.2 g | 3.2 g | +/−2 g | 3.2 g | 3.2 g |
| 1.6 g | +3.2 g | +/−2 g | 1.6 g | 1.6 g |
| −2.4 g | +1.6 g | +/−2 g | Negative rail | None |
| −2.4 g | 0 g | +/−8 g | −2.4 g | −2.4 g |

Table 4 illustrates an exemplary embodiment where the sensing element 12 has available ranges of +/−8 g, +/−4 g, +/−2 g, available offsets between −6 g and +6 g, and the processor 16 adjusts the offset and range based on prior measured values (here, the two previous values) to set the range to the smallest available range. If a freefall (0 g acceleration) is detected, then the offset is set to 0 g and the range is set to the maximum range of +/−8 g.

TABLE 4

| Actual Value | Offset | Range | Sensing Element Output | ADC Output |
|---|---|---|---|---|
| 3.2 g | 3.2 g | +/−2 g | 3.2 g | 3.2 g |
| 3.4 g | 3.2 g | +/−2 g | 3.4 g | 3.4 g |
| 3.7 g | 3.6 g | +/−2 g | 3.7 g | 3.7 g |
| 1.3 g | 4.0 g | +/−2 g | Negative rail | None |
| 0 g | 0 g | +/−4 g | 0 g | 0 g |
| 0 g | 0 g | +/−2 g | 0 g | 0 g |
| 0 g | 0 g | +/−8 g | 0 g | 0 g |

Table 4 shows that when the actual measured value changes rapidly from 3.7 g to 1.3 g, the range is increased to +/−4 g as a result. Further, when three consecutive values of 0 g are measured, the range is set to the maximum in anticipation of an acceleration spike. The three consecutive measurements are exemplary only, as other quantities could be used.

Table 5 illustrates an exemplary sequence of available offsets −6 g, −2 g, +2 g, +6 g for a sensing element 12 whose range is fixed at +/−2 g where all offsets are selected and used regardless of whether a valid measurement is obtained.

TABLE 5

| Actual Value | Offset | Sensing Element Output | ADC Output |
|---|---|---|---|
| 3.2 g | −6 g | Positive rail | None |
| 3.2 g | −2 g | Positive rail | None |
| 3.2 g | +2 g | 3.2 g | 3.2 g |
| 3.2 g | +6 g | Negative rail | None |

Table 6 illustrates an exemplary sequence of available offsets −6 g, −2 g, +2 g, +6 g for a sensing element 12 whose range is fixed at +/−2 g where the cycle is restarted once a valid measurement is obtained.

TABLE 6

| Actual Value | Offset | Sensing Element Output | ADC Output |
|---|---|---|---|
| 3.2 g | −6 g | Positive rail | None |
| 3.2 g | −2 g | Positive rail | None |
| 3.2 g | +2 g | 3.2 g | 3.2 g |
| 3.2 g | −6 g | Positive rail | None |

Table 7 illustrates an exemplary embodiment with available offsets of −6 g, −4 g, −2 g, 0 g, 2 g, 4, 6 g, and a fixed range of +/−2 g, where the offset is changed when the measured value comes within a threshold, here 0.5 g, of the range boundary.

TABLE 7

| Actual Value | Offset | Sensing Element Output | ADC Output |
|---|---|---|---|
| 3.2 g | 4 g | 3.2 g | 3.2 g |
| 2.1 | 2 g | 2.1 g | 2.1 g |
| 1.7 g | 2 g | 1.7 g | 1.7 g |
| −0.4 g | 0 g | −0.4 g | −0.4 g |

Other embodiments are possible and within the scope of the disclosure.

Figure 7:
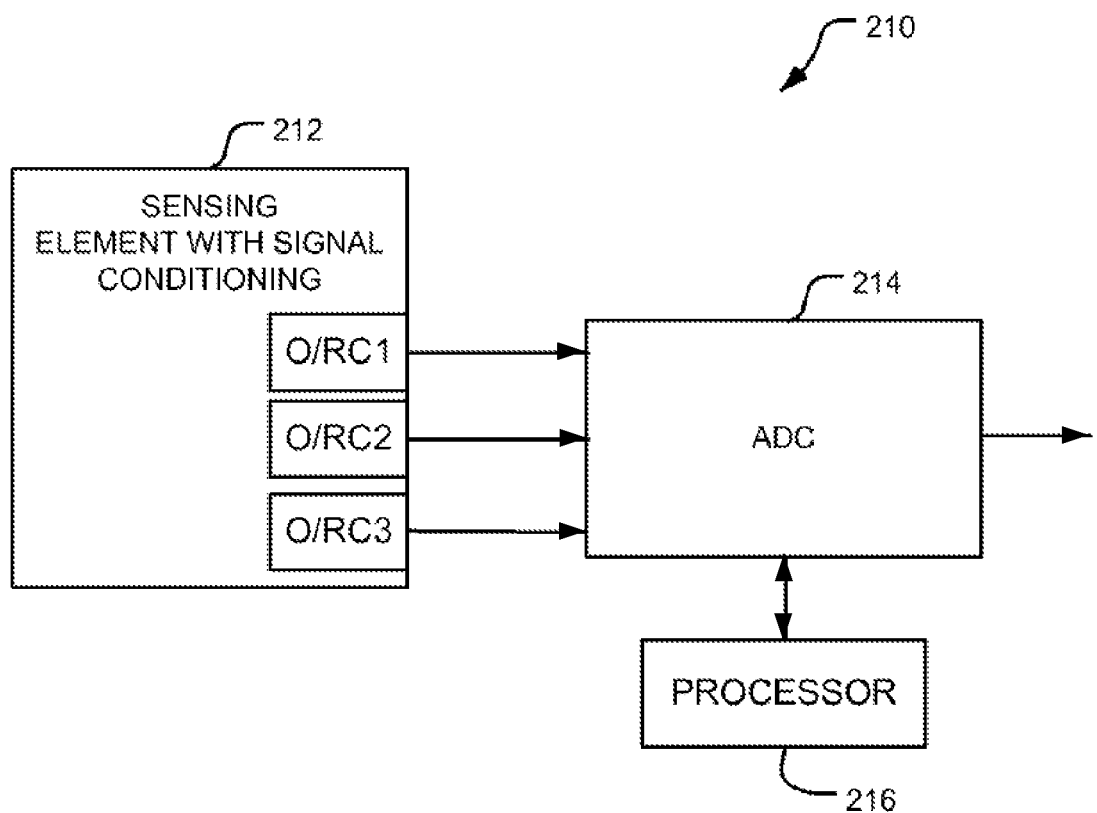
FIG. 7 is a block diagram of a device including a sensing element that provides multiple concurrent outputs.

For example, referring to FIG. 7, a device 210 includes a sensing element 212, an ADC 214, and a processor 216. The sensing element 212 is configured and connected to provide multiple, here three, outputs to the ADC 214. The element 212 has multiple sensing elements internally set with different parameters. Each of the outputs has a different offset-range combination (O/RC). For example, the sensing element could be an accelerometer with a maximum range of +/−8 g, with the three outputs shown each having a 0 g offset and having ranges of +/−2 g, +/−4 g, and +/−8 g, respectively. The sensing element 212 provides signals on the outputs simultaneously to the ADC 214. The ADC 214 has multiple individual ADCs, one for each output of the sensing element 212. Alternatively, the ADC 214 could have fewer individual ADCs and switch between the outputs. The processor 216 is configured to analyze the measurements from the sensing element 212 as converted to digital form by the ADC 214 and to cause the ADC 214 to output the valid measurement value corresponding to the lowest measurement range. For example, for a value of 3.2 g, the sensing element output for the +/−2 g range output will be a positive rail and thus invalid, the sensing element outputs for the +/−4 g range and the +/−8 g range will both be 4.2 g, and the processor 216 will cause the ADC 214 to output the measurement from the sensing element output with the +/−4 g range. The signal conditioning of the sensing element 212 includes analog and/or digital signal processing, amplification, etc. The signal conditioning provided for each of the outputs may be different than for one or more of the other outputs.

Figure 8:
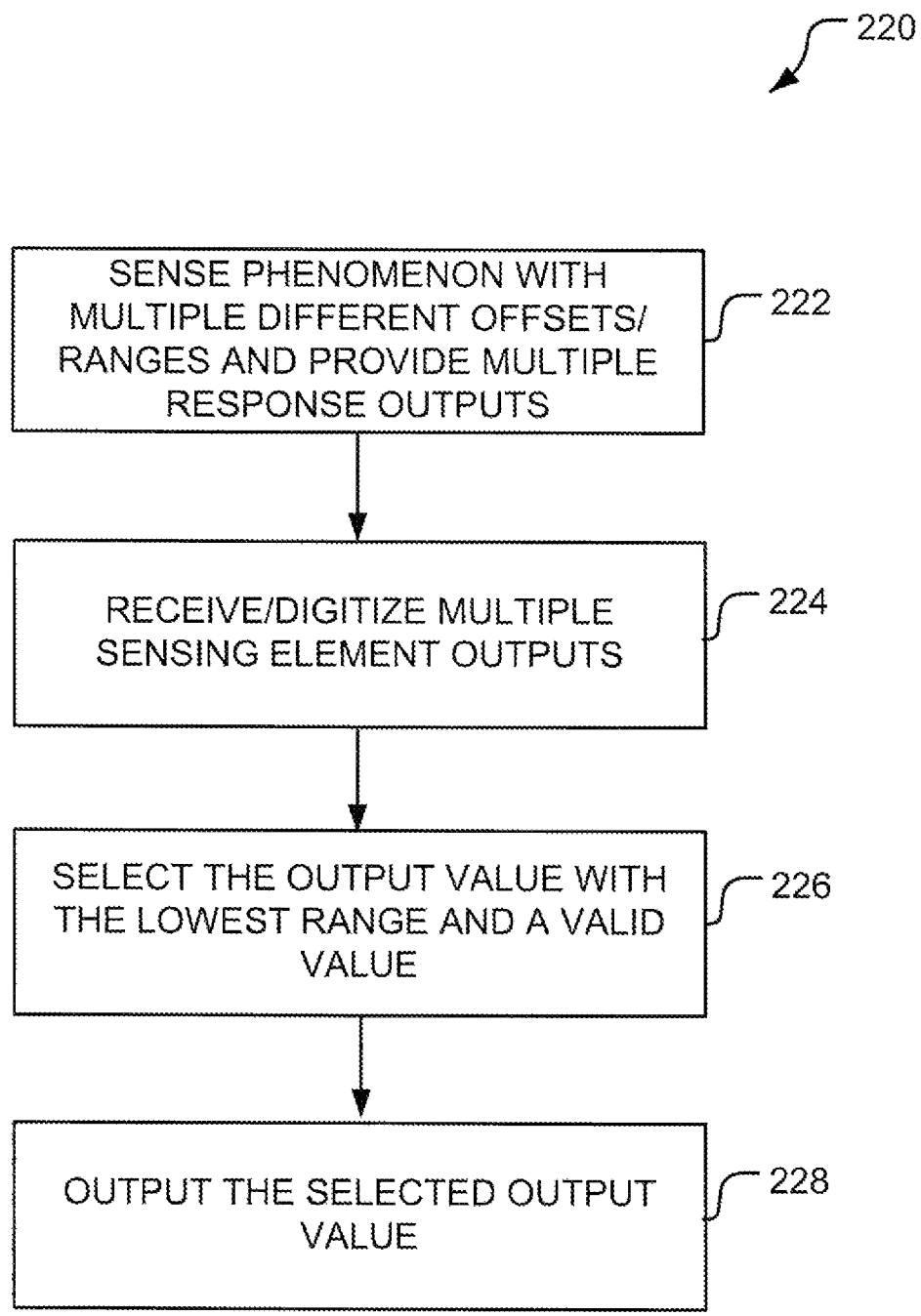
FIG. 8 a block flow diagram of a process of selecting a desired output from the sensing element shown in FIG. 7.

Referring to FIG. 8, with further reference to FIG. 7, a process 220 for selecting one of multiple possible sensing element outputs includes the stages shown. The process 220 is exemplary only, and is not limiting. The process 180 may be altered, e.g., by having stages added, removed or rearranged.

At stage 222, a relevant phenomenon is sensed by the sensing element 212. The phenomenon is sensed using different parameters, here different sensing ranges and possibly different offsets. Preferably, the phenomenon is sensed simultaneously/concurrently using the different configurations (different paramets). The sensing element outputs values from the different sensing configurations.

At stage 224, the outputs from the sensing element 212 are received and digitized. The ADC 214 receives the multiple output values and digitizes these values. Preferably, the values are digitized simultaneously. The digitized outputs are provided to the processor 216.

At stage 226, one of the digitized values is selected as an output from the ADC 214. The processor 216 analyzes the digitized values and selects the valid output having the lowest sensing range. The processor 216 indicates to the ADC 214 which of the values is selected.

At stage 228, the selected value is output. The ADC 214 responds to the processor's indication of which value is selected and outputs the corresponding value from the corresponding sensing configuration.

What is claimed is:

1. A device for sensing a phenomenon, the device comprising:
   a sensing element configured to measure the phenomenon using a first combination of a first measurement range and a first offset and to provide an analog indication of a value of the phenomenon;
   an analog-to-digital converter (ADC) coupled to the sensing element and configured to convert the analog indication to a digital indication; and
   a processor coupled to the ADC and the sensing element and configured to analyze the digital indication, including to perform a determination that the value of the phenomenon is within the first combination and whether the first measurement range is a smallest available measurement range of the sensing element, and, in response to the value being within the first combination and the first measurement range being larger than the smallest available range to determine a second combination of a second measurement range and a second offset for the sensing element with the second measurement range that is smaller than the first measurement range, and to cause the sensing element to change from the first combination to the second combination for measurement of the phenomenon.

2. The device of claim 1 wherein the processor is configured to determine a desired measurement range and offset for the sensing element and to provide a signal to the sensing element to cause the sensing element to use the desired combination as the second combination to measure the phenomenon.

3. The device of claim 2 wherein the processor is further configured to respond to a determination that the value of the phenomenon is outside the first combination to determine a third combination of a third measurement range and a third offset with the third measurement range being larger than the first measurement range and to cause the sensing element to change to the third combination for measurement of the phenomenon.

4. The device of claim 1 wherein the processor is configured to cause the sensing element to change from the first combination to the second combination for measurement of the phenomenon based on an expected measurement value of the phenomenon.

5. The device of claim 1 wherein the processor is further configured to cause the sensing element to change to a third combination of a third measurement range and a third offset with the third measurement range being larger than the first measurement range in response to a determination that the value of the phenomenon is changing rapidly.

6. The device of claim 1 wherein the processor is further configured to cause the sensing element to change to a third combination of a third measurement range and a third offset with the third offset being different than the first offset in response to a determination that the value of the phenomenon is within a threshold of a boundary of the first range.

7. The device of claim 1 wherein the processor is configured to cause the sensing element to change to the second combination in accordance with a predefined sequence of available combination of measurement ranges and offsets.

8. A device for sensing a phenomenon, the device comprising:
   a sensing element configured to concurrently measure the phenomenon with a plurality of combinations of measurement range and offset, each of the plurality of combinations associated with corresponding high and low ends, and to provide corresponding analog output for the combinations of measurement range and offset corresponding to a value of the phenomenon;
   an analog-to-digital converter (ADC) coupled to the sensing element and configured to convert the analog outputs into a plurality of digital outputs; and
   a processor coupled to the ADC and configured to analyze the digital outputs including to perform a determination for each of the digital outputs that a corresponding value for each of the digital outputs is invalid when the corresponding value is equal to the respective corresponding high end or to the respective corresponding low end, and to cause one of the digital outputs to be output by the device based, at least in part, on the determination for each of the digital outputs.

9. The device of claim 8 wherein the plurality of combinations comprise different offsets and a similar measurement range.

10. The device of claim 9 wherein the similar measurement range is a smallest measurement range available for the sensing element.

11. A device for sensing a phenomenon, the device comprising:
    measurement means for concurrently measuring the phenomenon with a plurality of combinations of measurement range and offset, each of the plurality of combinations associated with corresponding high and low ends, to provide a corresponding analog output for each of the combinations of measurement range and offset corresponding to a value of the phenomenon;
    an analog-to-digital converter (ADC) coupled to the measurement means and configured to convert the analog outputs into a plurality of digital outputs; and
    selection means coupled to the ADC for analyzing the digital outputs, including to perform a determination for each of the digital outputs that a corresponding value for each of the digital outputs is invalid when the corresponding value is equal to the respective corresponding high end or to the respective corresponding low end, and for selectively causing one of the digital outputs to be output by the device based, at least in part, on the determination for each of the digital outputs.

12. The device of claim 11 wherein the plurality of combinations comprise different offsets and a similar measurement range.

13. The device of claim 12 wherein the similar measurement range is a smallest measurement range available for the sensing element.

14. A method of measuring a phenomenon, the method comprising:
    sensing the phenomenon with a sensing element applying a first combination of a first measurement range and a first offset;
    providing, to a processor-based device, a first indication of a result of the sensing applying the first combination;
    performing a determination, by the processor-based device, that a value corresponding to the first indication is within the first combination and whether the first measurement range is a smallest available measurement range of the sensing element;

sensing the phenomenon with the sensing element applying a second combination of a second measurement range and a second offset, wherein the second measurement range is smaller than the first measurement range, the second combination determined based, at least in part, on the determination of whether the value corresponding to the first indication is within the first combination and the first measurement range is larger than the smallest available range; and providing, to the processor-based device, a second indication of a result of the sensing applying the second combination.

15. The method of claim 14 further comprising:
sensing the phenomenon with the sensing element applying a third combination of a third measurement range and a third offset in response to determining that the value corresponding to the first indication is indicative of an invalid, out-of-range, measurement;
wherein the third measurement range is larger than the first measurement range.

16. The method of claim 14 wherein the second combination is the smallest available range of the sensing element, the method further comprising setting an offset of the sensing element such that the first value will be within the combination range adjusted by the offset.

17. The method of claim 14 further comprising determining an expected value of the phenomenon, wherein the second combination is based on the expected measurement value of the phenomenon.

18. The method of claim 14 further comprising:
sensing the phenomenon with the sensing element applying a third combination of a third measurement range and a third offset with the third measurement range being larger than the first measurement range in response to determining that the value of the phenomenon is changing rapidly.

19. The method of claim 14 wherein sensing the phenomenon with the sensing element applying a third combination of a third measurement range and a third offset with the third offset being different than the first offset in response to a determination that the value of the phenomenon is within a threshold of a boundary of the first measurement range.

20. The method of claim 14 further comprising selecting the second combination in accordance with a predefined sequence of available combinations of measurement ranges and offsets.

21. A computer program product residing on a non-transitory computer-readable medium and comprising computer-readable instructions configured to cause a processor to:
analyze an indication of a value of a phenomenon sensed by a sensing element using a first combination of a first measurement range and a first offset;
perform a determination of whether a value corresponding to the first indication is within the first combination and whether the first measurement range is a smallest available measurement range of the sensing element;
determine a second combination of a second measurement range and a second offset for the sensing element, wherein the second measurement range is smaller than the first measurement range, based, at least in part, upon the determination that the value corresponding to the first indication is within the first combination and the first measurement range is larger than the smallest available range; and
cause the sensing element to change from the first combination to the second combination for sensing the phenomenon.

22. The computer program product of claim 21 wherein the instructions are further configured to cause the sensing element to change to a third combination of a third measurement range and a third offset, wherein the third measurement range is larger than the first measurement range in response to a determination that the value of the phenomenon is outside the first combination.

23. The computer program product of claim 21 further comprising instructions configured to cause the processor to determine an expected measurement value of the phenomenon, wherein the instructions configured to cause the sensing element to change to the second combination are configured to set the second combination based on the expected measurement value of the phenomenon.

24. The computer program product of claim 21 wherein the instructions are further configured to cause the sensing element to change to a third combination of a third measurement range and a third offset with the third measurement range being larger than the first measurement range in response to a determination that the value of the phenomenon is changing rapidly.

25. The computer program product of claim 21 wherein the instructions are further configured to cause the sensing element to change to a third combination of a third measurement range and a third offset with the third offset being different than the first offset in response to a determination that the value of the phenomenon is within a threshold of a boundary of the first measurement range.

26. The computer program product of claim 21 wherein the instructions configured to cause the sensing element to change to the second combination are configured to cause the sensing element to change to the second combination in accordance with a predefined sequence of available combinations of measurement ranges and offsets.

27. An apparatus comprising:
means for sensing the phenomenon with a sensing element applying a first combination of a first measurement range and a first offset;
means for providing a first indication of a result of the sensing applying the first combination;
means for performing a determination that a value corresponding to the first indication is within the first combination and whether the first measurement range is a smallest available measurement range of the sensing element;
means for sensing the phenomenon with the sensing element applying a second combination of a second measurement range and a second offset, wherein the second measurement range is smaller than the first measurement range, the second combination determined based, at least in part, on the determination of whether the value corresponding to the first indication is within the first combination and the first measurement range is larger than the smallest available range; and
means for providing a second indication of a result of the sensing applying the second combination.

28. The apparatus of claim 27, further comprising:
means for sensing the phenomenon with the sensing element applying a third combination of a third measurement range and a third offset in response to determining that the value corresponding to the first indication is indicative of an invalid, out-of-range, measurement;
wherein the third measurement range is larger than the first measurement range.

29. A method comprising:
concurrently measuring, by a processor-based device, a phenomenon with a plurality of combinations of measurement range and offset, each of the plurality of combinations associated with corresponding high and low ends, to provide a corresponding analog output for each of the combinations of measurement range and offset corresponding to a value of the phenomenon;

converting, by the processor-based device, the analog outputs into a plurality of digital outputs;

analyzing, by the processor-based device, the digital outputs, including performing a determination for each of the digital outputs that a corresponding value for each of the digital outputs is invalid when the corresponding value is equal to the respective corresponding high end or to the respective corresponding low end; and selectively causing, by the processor-based device, one of the digital outputs to be output based, at least in part, on the determination for each of the digital outputs.

30. The method of claim 29, wherein the plurality of combinations comprise different offsets and a similar measurement range.

31. The method of claim 30, wherein the similar measurement range is a smallest measurement range available for the sensing element.

32. A computer program product residing on a non-transitory computer-readable medium and comprising computer-readable instructions configured to cause a processor to:

concurrently measure a phenomenon with a plurality of combinations of measurement range and offset, each of the plurality of combinations associated with corresponding high and low ends, to provide a corresponding analog output for each of the combinations of measurement range and offset corresponding to a value of the phenomenon;

convert the analog outputs into a plurality of digital outputs;

analyze the digital outputs, including performing a determination for each of the digital outputs that a corresponding value for each of the digital outputs is invalid when the corresponding value is equal to the respective corresponding high end or to the respective corresponding low end; and selectively cause one of the digital outputs to be output by the device based, at least in part, on the determination for each of the digital outputs.

33. The computer program product of claim 32, wherein the plurality of combinations comprise different offsets and a similar measurement range.

34. The computer program product of claim 32, wherein the similar measurement range is a smallest measurement range available for the sensing element.

* * * * *